United States Patent [19]

Guilbeau

[11] 4,311,412
[45] Jan. 19, 1982

[54] OFFSHORE BUMPER SYSTEM AND METHOD OF MANUFACTURING

[75] Inventor: Edgar A. Guilbeau, Fort Bend, Tex.

[73] Assignee: Regal International, Inc., Corsicana, Tex.

[21] Appl. No.: 54,443

[22] Filed: Jul. 3, 1979

[51] Int. Cl.³ .................................................. B63H 21/04
[52] U.S. Cl. .................................. 405/212; 114/219; 267/140; 405/215
[58] Field of Search ................ 114/219, 220; 405/212, 405/213, 215, 216, 211, 214; 267/139–141, 152, 153, 140.5, 141.2–141.7, 57.1 R; 248/615, 616; 293/121

[56] References Cited

U.S. PATENT DOCUMENTS

| | | | |
|---|---|---|---|
| 2,655,005 | 10/1953 | Kinneman | 114/219 X |
| 3,235,244 | 2/1966 | Hein | 114/219 X |
| 3,311,081 | 3/1967 | Parker | 114/220 |
| 3,426,542 | 2/1969 | Hindman et al. | 114/219 X |
| 3,541,800 | 11/1970 | Walker et al. | 114/219 X |
| 3,564,858 | 2/1971 | Pogonowski | 114/219 X |
| 3,572,677 | 3/1971 | Damon | 267/57.1 R |
| 3,873,076 | 3/1975 | Evans | 114/219 X |
| 3,991,582 | 11/1976 | Waldrop et al. | 114/220 X |
| 3,995,437 | 12/1976 | Drewett | 114/219 X |
| 4,005,672 | 2/1977 | Files | 114/219 |
| 4,084,801 | 4/1978 | Landers | 114/219 X |
| 4,098,211 | 7/1978 | Files et al. | 114/219 |
| 4,109,474 | 8/1978 | Files et al. | 114/219 X |

FOREIGN PATENT DOCUMENTS 725965 8/1942 Fed. Rep. of Germany ...... 405/212

Primary Examiner—Sherman D. Basinger
Attorney, Agent, or Firm—John F. Booth; Gerald G. Crutsinger; Monty L. Ross

[57] ABSTRACT

A shock absorbing bumper system assembly (10) is provided for attachment to a structural member (12) of an offshore platform. The assembly (10) utilizes a vertical column (34) supported from arms (20) and (22). An outer protector (32) surrounds the column (34) and is eccentric to the protector. A pair of resilient ring elements (38) and (40) are positioned in an axially spaced relationship and bonded onto the column (34). The rings (38) and (40) conform to the annular space formed between protector (32) and column (34). Resilient connectors (26) and (28) can be used and comprise rings (44) similar in construction to rings (38) and (40). The system can be fabricated by forming subassemblies (62) comprising rings bonded onto the exterior of short lengths of pipe.

8 Claims, 7 Drawing Figures

OFFSHORE BUMPER SYSTEM AND METHOD OF MANUFACTURING

TECHNICAL FIELD

The present invention relates to offshore bumper systems for use in protection of offshore structures from damage from contacts with vessels such as boats, barges and the like and in particular, an offshore bumper system of the type using resilient elements to absorb shock.

BACKGROUND OF THE INVENTION

In the exploration and development of offshore petroleum reserves, it is sometimes necessary to erect platforms located miles off shore. These platforms form a base on which drilling, exploration and storage activities can occur. Some of these platforms have legs or other types of support structure which extend down into the water. To transport men and material to and from these platforms, it is necessary to dock vessels alongside. In some situations, these vessels are small. In others, the vessels are quite large and contact between these larger vessels and the platform leg structure can weaken or otherwise damage either the structure or the vessel itself.

To protect these platforms from damage due to contact by vessels operating near the platforms, systems have been designed which are attached to the platform adjacent the water level and operate to fend off vessels and absorb shocks from vessels coming into contact with the platform.

One system which has been used for years in the industry has been known as the Lawrence Allison system. This system utilizes a vertically standing piece of pipe or other structural member which is supported from the platform at the water level. The pipe typically has its upper end supported from the leg of the platform at a position above the high tide level and the lower end connected to the platform at a position below the low tide level. The system utilizes a plurality of rubber vehicle tires with the vertically standing structural member exiting through the center of the tires to form a stack of tires which absorb shocks from contact with vessels. Some of these Lawrence Allison systems leave the outer surfaces of tires exposed, and some have a cylindrical metal skin or can supported around the outside of the tires and spaced away from the central support by the tires. In the latter case, the tires resiliently separate the outer contact skin from the inner central support.

In other prior art systems, the outer can or contact surface are resiliently separated from the central structural support by a preformed rubber element. In one such system, the outer protective shield or can and the central support are coaxially positioned. A solid rubber element extends the length of the outer shield and occupies less than 360° but at least 180° of the annular space formed between the outer shield and the central support. In these devices, the rubber element has a constant radial thickness positioned in the annular space on the side from which contact with vessels normally occurs.

Although prior art bumper systems have performed satisfactorily, in many ways unappreciated by the industry, their design has contained aspects which were redundant and which added to the overall costs of the systems. These systems, for example, failed to appreciate and/or accommodate into the design cost savings and size reductions which could be accomplished if the limited directions from which contact forces are applied to the system are taken into account. Further, these systems utilized complicated manufacturing and fabrication techniques which were unnecessary. In the past, these systems have been expensive to manufacture and install and as a consequence have not proven entirely satisfactory.

DISCLOSURE OF THE INVENTION

A shock absorbing system for protecting the legs of an offshore platform against excessive shock is disclosed. The system has a vertical support column which is supported from its upper and lower ends. A cylindrical protector is eccentrically positioned around the support column and provides a contact surface for vessels. At least two rubber shock absorbing elements are designed to fit in the annular space formed between the column and the outer protector. These shock absorbing members are positioned in axially spaced locations within the annular space. These shock absorbing elements have their interior surfaces bonded to the interior vertical column.

In one embodiment, support column is connected through rigid connections to horizontally extending arms connected to the platform. In another embodiment, a resilient joint is formed between the central support and the horizontally extending arms.

The invention encompasses a method of forming a shock absorbing system in which a resilient shock absorbing element has its interior connected to a short length of the support column. At least two subassemblies of these resilient elements and the short sections of pipe are welded on the ends of a section of tubing. In addition, these subassemblies can be welded in position to form the upper and lower resilient connectors of the second embodiment.

BRIEF DESCRIPTION OF THE DRAWINGS

For a complete understanding of the present invention and the advantages thereof, reference is now made to the following Description taken in conjunction with the accompanying Drawings in which.

DETAILED DESCRIPTION OF THE INVENTION

Figure 1:
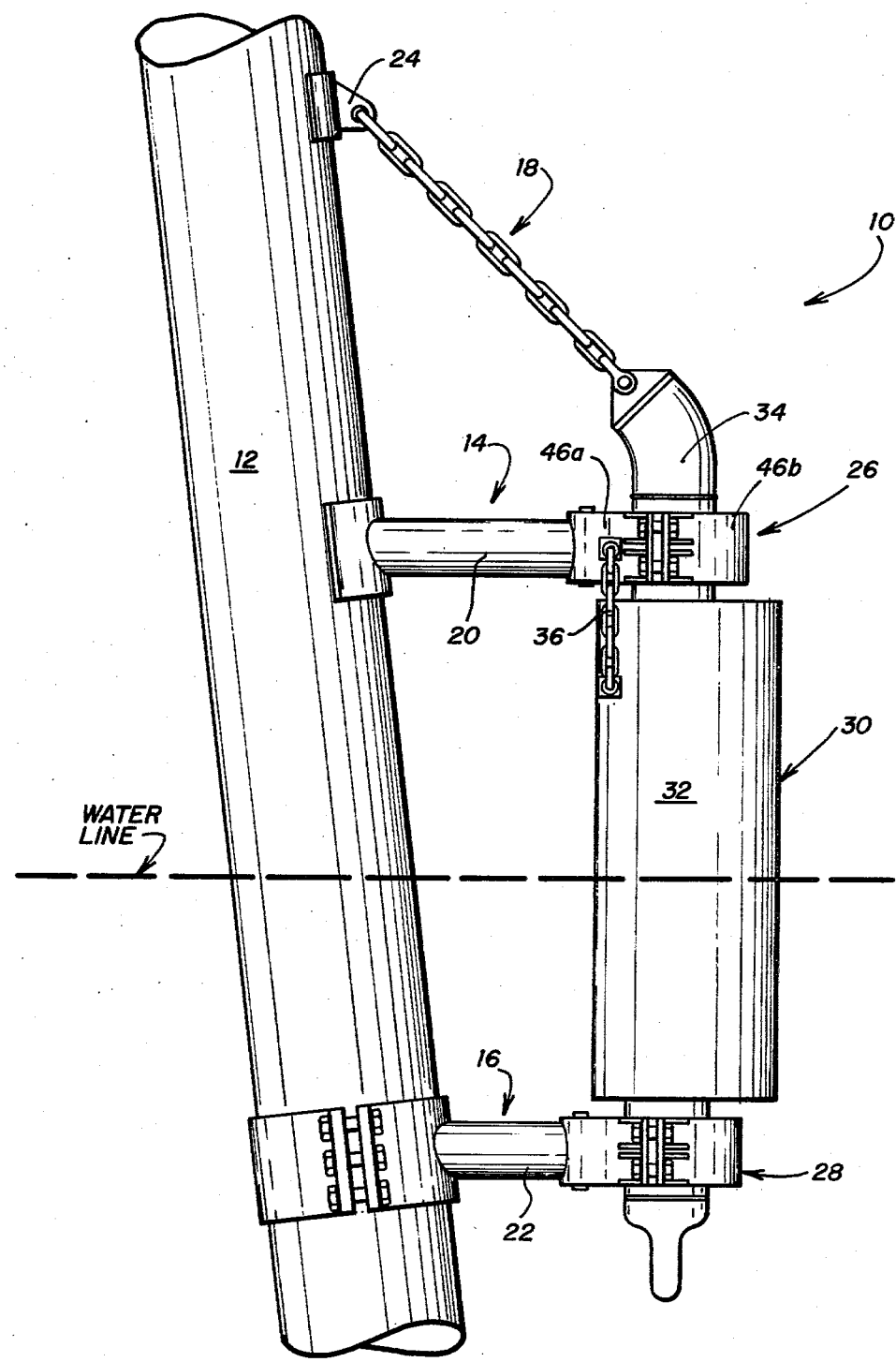
FIG. 1 is a side elevation of the shock absorbing system of the present invention shown attached to the leg of an offshore platform.

The invention can best be understood by referring to the drawings. The drawings disclose by way of example two separate embodiments of the invention. One embodiment is shown in FIGS. 1 through 4 while the alternative embodiment is shown in FIG. 5. In describing the invention by referring to the FIGURES, the same reference numerals will be used to identify corresponding parts of the system in all of the views.

The embodiment shown in FIGS. 1-4 will be described initially. In FIG. 1, a shock absorbing bumper assembly 10 is shown in a exemplary installation attached to a vertically extending structural member 12. The structural member 12 can be the leg or other structural portion of an offshore platform, jackup, submersible or semi-submersible rig or the like. It is also envisioned that structural member 12 could represent a portion of a pier or piling of a dock, warf or the like.

Assembly 10 is shown attached to the structural member 12 at the water level. Assembly 10 is positioned to provide protection for the structural member 12 by fending off boats, barges and other vessels which may, by accident or necessity, come into contact with the structural member 12. It is also envisioned that the assembly 10 could be utilized to protect fluid carrying conduits, such as standpipes and the like, from damage due to impact from vessels.

The assembly 10 is supported from the member 12 by upper and lower horizontally extending support assemblies 14 and 16, respectively, and an optional tension member assembly 18. The assembly 10 is designed to provide a contact surface spaced away from the member 12 and has resilient means for absorbing the shock imparted to the assembly by vessels contacting the assembly. The assembly reduces the maximum shock loads transferred to the members 12 by contact with the vessel.

As shown in the embodiment of FIGS. 1-4, the upper and lower support assemblies 14 and 16 comprise upper and lower generally horizontally extending arms 20 and 22. In the present embodiment, the upper arm 20 is shown welded by means of a flange to the structural member 12 and consists of a piece of hollow structural tubing. The lower arm 22 is of similar construction to the upper arm 20 and is attached to the structural member 12 by means of a clamp assembly as shown. It is envisioned, of course, that the arms 20 and 22 could be formed from other materials besides hollow structural tubing such as box beams, I beams, channels, and the like. It being important only that the arms 20 and 22 have sufficient structural integrity to support the assembly 10 in place and withstand the loads applied by contact between the assembly 10 and vessels. It is also envisioned that either or both of the upper or lower arms 20 and 22 could have a shock cell of the type described in U.S. Pat. Nos. 4,005,672 or 4,109,474 connected thereto to provide additional shock absorbing capacity. For simplicity, the details of the shock cell and its connection to the arms 20 and 22 is not shown, it being understood, of course, that the mounting would be in accordance with the teachings of the above-mentioned patents whose specification is incorporated herein by reference for that purpose. The optional tension member 18 is connected to the member 12 at 24 in the manner described in U.S. Pat. No. 4,109,474, whose specification is incorporated herein by reference.

Each of the arms 20 and 22 have shock absorbing connector assemblies 26 and 28 supported from the ends thereof. The details of these shock absorbing connector assemblies will be described hereinafter.

The assembly 10 has a contact assembly 30 which is supported from the arms 20 and 22. Assembly 30 is shown in FIG. 1 as being positioned in a vertically extending attitude and is the portion against which vessels contact during use of the bumper system.

According to a particular feature of the present invention, the contact assembly 30 comprises a vertically extending support column 34 connected to and spanning between the upper and lower shock absorbing connector assemblies 26 and 28. A cylindrical outer protector 32 is positioned to enclose a portion of the column 34. According to another feature of the present invention, the outer protector 32 is eccentrically positioned around the column 34 and is spaced therefrom as will be hereinafter described in more detail.

In the embodiment shown, the outer protector 32 extends vertically through the area in which contact between vessels and the assembly usually occurs and is of sufficient length to accommodate changes in water level such as those due to tides. The outer protector 32 in the embodiment shown is held in position by support chains 36. These chains 36 are positioned on opposite sides of the column 34 and have one end connected to the outer protector 32 and the other end connected to the upper connector assembly 26.

Figure 2:
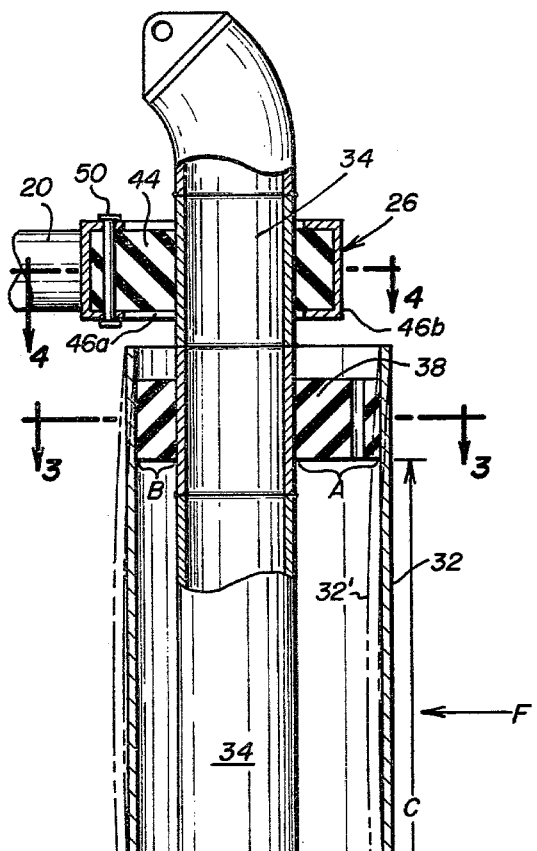
FIG. 2 is a view similar to FIG. 1 showing the shock absorbing system of FIG. 1 partially in section.

As can be seen in FIGS. 2-5, the outer protector 32 is separated from the column 34 by upper and lower shock rings 38 and 40, respectively. In the embodiment shown, the outer protector 32 is a cylindrical member which can be formed from a length of standard tubing. The inner column is likewise formed from pipe. The outer protector 32 and inner column 34 are positioned with their center lines parallel but not coaxial. The center line of the outer protector 32 is displaced to the right as shown in FIG. 2 from the center line of column 32.

The arrow identified as F in FIG. 2 represents normal direction of force applied by vessels coming into contact with the system. The center line 35 of the column 34 is displaced in the direction of arrow F (or in the direction of the normal force applied by a vessel) from the center line 33 of the outer protector 32. This displacement of the center line 35 increases the size of the thickness of the annular space between the outer protector 32 and the column 34 on the side nearest the force vector F. This eccentric placement of the outer protector 32 and column 34 also decreases the thickness of the annular space on the side of the column 34 away from the arrow F. The maximum thickness of the annular space is shown in FIGS. 2 and 3 as A whereas the minimum annular thickness is shown as B.

In one example of the first embodiment, the outer protector 32 is 30-inch diameter metallic pipe, the column 34 is 10-inch diameter pipe, and the axes of the two parts are separated by a distance of approximately a little over 5½ inches. The annular thickness A will be approximately 14 inches while the annular thickness B will be approximately 2¾ inches. Thus, on the side on which shock forces are normal to the system the annular space is a maximum, and in the example given, the maximum thickness is five times larger than the minimum. It should be understood that the dimensions are exemplary only and others could be selected as desired.

According to a particular feature of the present invention, both the upper and lower shock rings 38 and 40, respectively, are made from resilient material and are shaped to closely conform to the annular space formed between the column 34 in outer protector 32. The upper shock ring 38 is shown in FIG. 3. In this embodiment, the shock rings 38 and 40 are each connected, for example, by bonding to the exterior surface of the column 34 to support the rings in a vertical position. In addition, a plurality of clearance openings 42 can be formed through the rings.

Figure 3:
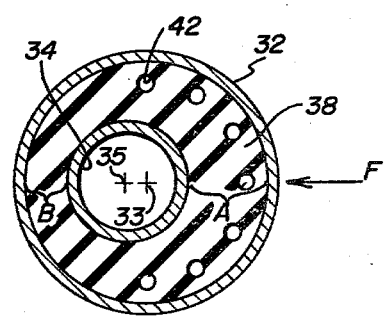
FIG. 3 is a sectional view taken on line 3—3 of FIG. 2 looking in the direction of the arrows.

By constructing the rings of resilient material in the shape shown in FIGS. 2 and 3, additional resilient shock absorbing material is positioned on the side of the column 34 where the compression loads are normally the highest. It is to be appreciated that shock loads applied to the system in the reverse direction of arrow F will be minimal since that side of the system is positioned facing the platform. It is envisioned, of course, that the shock rings 38 and 40 could be formed without the openings 42 and alternatively could be bonded to the interior wall of the outer protector 32 if desired. It is also envisioned that the rings could be mechanically connected to the column instead of by bonding.

According to another feature of the present invention, it should be noted that the rings 38 and 40 are axially spaced a distance shown in FIG. 2 as C. This spacing leaves the outer protector unsupported between the two rings. In designing the system of the present invention, the protector is selected to be positioned so that the contact with vessels will occur in the unsupported space between rings 38 and 40. In addition, outer protector 32 is selected of a size and material so that it will deflect into the annular space to position 32 as shown in FIG. 2 in phantom lines upon a vessel. Thus, the outer protector 32 itself provides a shock absorbing effect in addition to the shock absorbing effect of compressing rings 32. In addition, increasing the thickness of the annular space provides more clearance and allows the use of outer protectors which are more resilient and less stiff, thus, increasing the shock absorbing capacity of the overall system.

Figure 4:
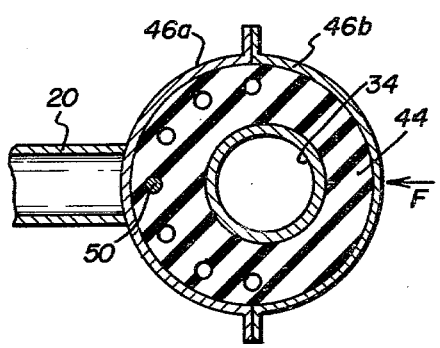
FIG. 4 is a sectional view taken on line 4—4 of FIG. 2 looking in the direction of the arrows.
Figure 5:
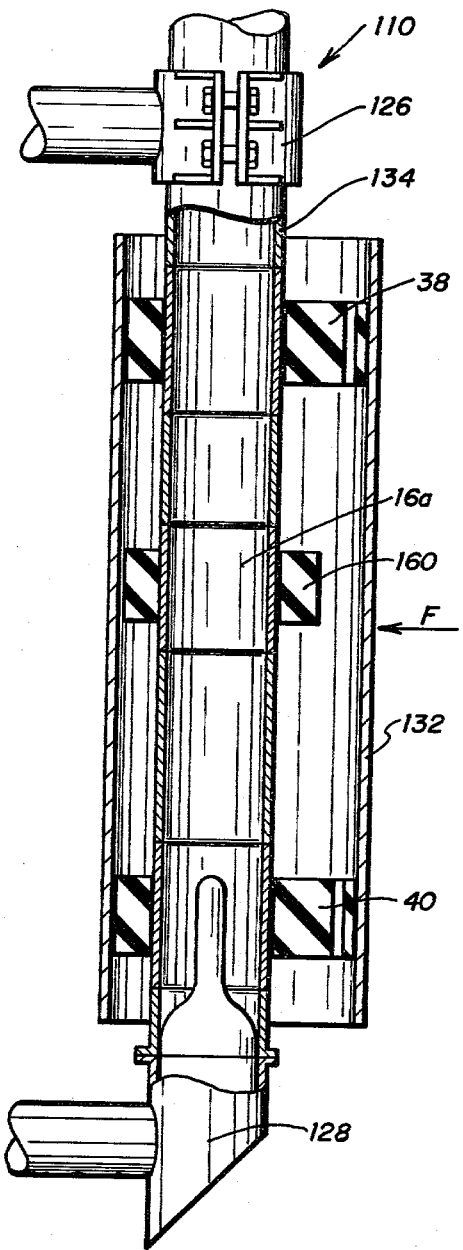
FIG. 5 is a view similar to FIG. 2 of a second embodiment of the present invention.

The details of the construction of the connector assembly 26 is shown in FIGS. 2 and 4. The construction of connector 26 is typical for the connector 28. Connector assembly 26 utilizes a shock ring 44 identical in construction to the shock rings 38 and 40. Ring 44 is bonded to the exterior of the column 34. Shock ring 34 however is located 180° from the position of rings 38 and 40 so that the maximum thickness of the ring 44 is on the platform side of the column between the column 34 and the upper arm 20. A cylindrical retainer assembly is formed on the end of the arm 20 to house and contact the outer surface of the shock ring 44. This cylindrical retainer is formed in two semicylindrical halves 46a and 46b. The halves are bolted together by suitable fasteners and flanges are provided thereon which allows for disassembly. It is to be understood of course that elements 46a and 46b could be designed in segments other than halves.

According to a particular feature of the present invention, a pin member 50 extends through suitable guide openings in the half 46a and extends through one of the openings 42 in the ring 44. This pin 50 prevents rotation of the shock ring 44 within the upper cylindrical assembly and maintains the bumper system in proper alignment. As can be seen in FIGS. 2 and 4, the thickest portion of the ring 44 is positioned on the side of the column 34 where it is of most use in providing compressive shock absorbing functions from forces in the direction of arrow F.

In operation, a vessel will come into contact with the outer protector 32 and impart shock forces to the system 10 in the direction of arrow F. These forces are absorbed in the system by compression of shock cells if they are present, compression of rings 44 in connector assemblies 26 and 28, compression of rings 38 and 40 in contact assembly 30 and by deflection or bending of outer protector 32. These elements each add together to increase the overall shock absorbing capacity of the bumper system.

In FIG. 5, an alternate embodiment of the bumper assembly is shown as 110. This embodiment illustrates two variations in the system 10 which can be used either individually or together. First, assembly 110 does not utilize upper and lower shock absorbing connectors 26 and 28 but rather uses the conventional upper and lower rigid mechanical connections 126 and 128, respectively. These connectors 126 and 128 are not designed to provide a substantial shock absorbing function and can be used where none is required.

Second, in assembly 110, the inner column 134 is separated from the eccentrically positioned outer protector 132 by upper and lower shock rings 38 and 40, identical to those shown in FIGS. 1-4. In addition, a centrally positioned resilient member 160 is bonded to the exterior of the inner column 134 and is positioned approximately intermediate the rings 38 and 40. This member 160 is cylindrical in shape and is spaced away from the inside wall of the protector 132 on the side adjacent to the force arrow F. This resilient member 160 becomes effective upon deflection of the shock absorbant elements 38 and 40 and bending of the member 132 to a point where the interior wall of the member 132 comes into contact with the outer surface of the ring 160. This ring 160 provides a second stage of shock absorbing action within the column itself.

Figure 6:
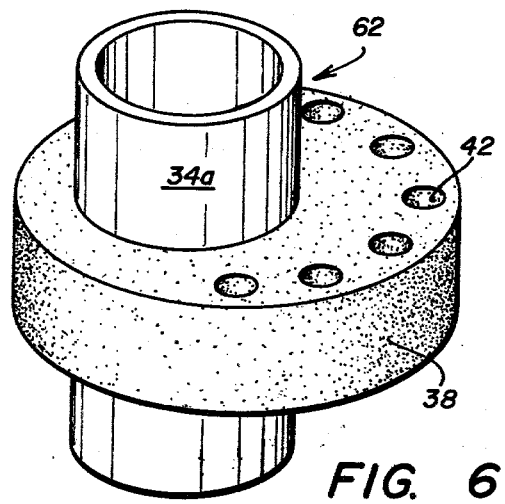
FIG. 6 is a perspective view of a subassembly of the shock absorbing element.
Figure 7:
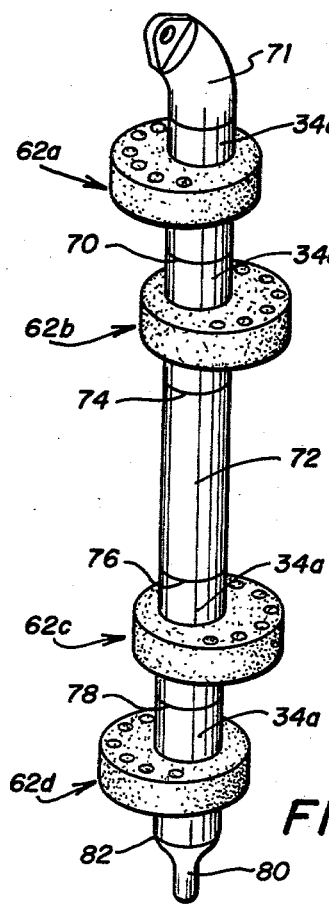
FIG. 7 is a perspective view of a subassembly of a support column.

The method of fabricating the system comprises a particular feature of the present invention. Columns 34 are fabricated in sections. First, a short section of pipe 34a, as shown in FIG. 6, is bonded to the interior of a shock ring 38 to form a shock ring subassembly 62. Once a plurality of these shock ring assemblies 62 have been fabricated, they can be connected together by welding lengths of pipe together as shown in FIG. 7 and properly orientating the rings 38 as required. The fabrication of support column 34 can be accomplished by axially aligning two subassemblies 62a and 62b with their respective rings 180° out of phase with each other. The sections 34a can be welded together at 70. A top cap 71 can be welded on the upper end of the short section of pipe of 62a with the cap 71 orientated over the thickest part of the ring on 62a. Next, a section of pipe 72 can be welded to the end of the pipe section of 62b. This pipe 72 is selected in length to fit the application of the system. Next, subassembly 62c is welded at 76 in place with its ring orientated like subassembly 62b. Subassembly 62d is welded at 78 to subassembly 62c with the ring of 62d orientated like subassembly 62a. A lower stab 80 (or other lower connecting assembly) can be welded at 82 to subassembly 62d. Once assembled as shown in FIG. 7, the ring of subassembly 62a becomes ring 44 in connector 26. The ring in subassembly 62b and 62c becomes rings 38 and 40, respectively, while the ring in subassembly 62d becomes the ring in connector 28.

By fabricating column 34 in this manner from subassemblies 62, variations in axial spacing of the rings in systems 10 and 110 can be easily accommodated by lengthening the section of pipe 72 or by adding spacers between the subassemblies 62a and 62b or between 62c and 62d. This method provides for flexibility in design of systems from standard subassemblies, eliminating expensive molds and equipment for customized and specialized parts. In addition, this method allows the use of reasonable lengths of pipe for bonding operations to the individual rings. Further, a ring such as 160 can be formed in a subassembly 160*a* and this subassembly 160 can be welded at the center of pipe 72 as shown in FIG. 5.

In summary, the present invention provides an apparatus for attachment to an offshore platform which provides shock absorbing elements having an increased capacity due to the eccentric design. In addition, for a given capacity, the size and cost of a system is reduced. Further, a shock ring design is versatile and can be used in more than one location of the system but also can be used for a connector to the structure itself. In addition, the modular construction of the present ring subassembly provides for simple and inexpensive manufacture thereof.

Although two embodiments of the present invention have been illustrated in the accompanying drawings and described in the foregoing detailed description, it will be understood that the invention is not limited to the embodiments disclosed, but is capable of numerous rearrangements, modifications, and substitutions within the scope of the invention as defined in the appended claims.

What is claimed:

1. In a bumper assembly for connection to an offshore structural member to provide protection to said structural member from contact by vessels such as boats and barges, said assembly having upper and lower support arms for connection to said structural member, a vertically extending unitary nonbuoyant cylindrical contact member of sufficient length to span an area of contact and with an outer surface for engagement by vessels, means supporting said contact member in vertical position, a support member axially extending through said contact member and supported from said arms, a pair of axially spaced resilient means separating said contact member and said support member, means fixing each of said resilient means against rotation with respect to said support arms, the improvement which comprises said axially spaced means positioning said contact member with respect to said support member with the axis of said contact member radially spaced from and extending parallel to the axis of said support member.

2. The assembly of claim 1 wherein said improvement further comprises each of said axially spaced means conforms to the shape of the annular space formed between said support and contact members.

3. The assembly of claim 1 wherein said axially spaced means each has a cylindrical outer surface of a shape corresponding to the interior wall of said contact member and each of said axially spaced means has a cylindrical inner surface conforming to the exterior surface of said support member.

4. The assembly of claim 3 wherein said interior surfaces of said pair of axially spaced means are bonded onto the exterior of said support member.

5. In a bumper assembly for connection to an offshore member to provide protection to a structural member from contact by vessels such as boats and barges, said assembly having upper and lower support arms for connection to said structural member, a vertically extending unitgary nonbuoyant contact member of sufficient length to span an area of contact and with an outer surface for engagement by vessels, means for supporting said contact member in a vertical position, at least one support member extending into said contact member and supported from said support arms, a pair of axially spaced resilient means separating said contact member and said at least one support member, means fixing each of said resilient means against rotation with respect to said support arms, the improvement which comprises said axially spaced means positioning said contact member with respect to said support member with the axis of said contact member radially spaced from and extending parallel to the axis of said support member.

6. The assembly of claim 5 wherein said improvement further comprises each of said axially spaced means conforms to the shape of the annular space formed between said support and contact members.

7. The assembly of claim 5 wherein said axially spaced means each has a cylindrical shaped outer surface of a shape corresponding to the interior wall of said contact member and each of said axially spaced means has a cylindrical interior surface conforming to the exterior surface of said support member.

8. The assembly of claim 7 wherein said interior surfaces of said pair of axially spaced means are bonded onto the exterior of said support member.

* * * * *